Aug. 4, 1925.

M. E. RALSTEN 1,548,746

COTTER PIN

Filed July 12, 1924

M. E. Ralsten
INVENTOR

BY Victor J. Evans
ATTORNEY

Patented Aug. 4, 1925.

1,548,746

UNITED STATES PATENT OFFICE.

MAXWELL E. RALSTEN, OF OMAHA, NEBRASKA.

COTTER PIN.

Application filed July 12, 1924. Serial No. 725,681.

*To all whom it may concern:*

Be it known that I, MAXWELL E. RALSTEN, a citizen of the United States, residing at Omaha, in the county of Douglas and State of Nebraska, have invented new and useful Improvements in Cotter Pins, of which the following is a specification.

This invention relates to a cotter pin structure and has for its primary object the construction of a cotter pin which may be very readily connected to a wrist pin for locking the same against accidental removal.

An object of the invention is the novel manner of directly connecting the structure to a piston so as to positively prevent accidental movement.

Besides the above my invention is distinguished in the novel manner of arranging the parts so that the pin may be readily removed from the set screw for readily disconnecting the parts for allowing ready removal of the wrist pin.

With these and other objects in view the invention will be better understood from the following detailed description taken in connection with the accompanying drawing wherein.

Figure 2:
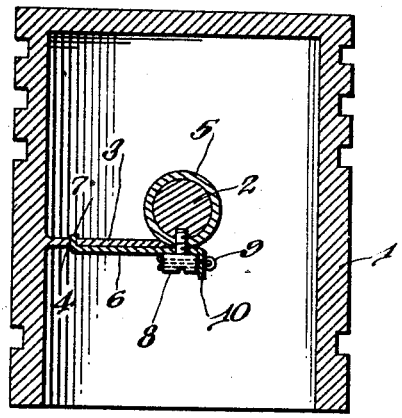
Fig. 2 is a vertical sectional view on the line 2—2 of Fig. 1.
Figure 1:
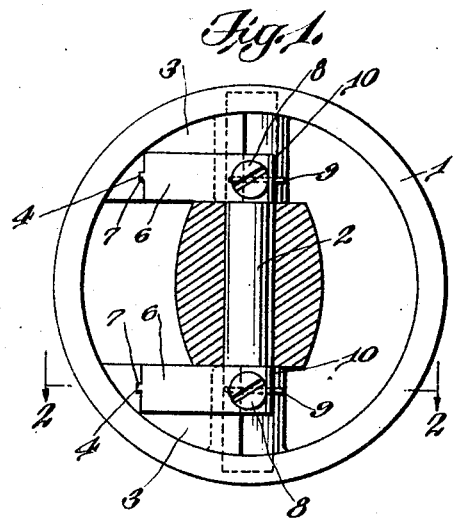
Fig. 1 is a bottom plan view of a piston showing my invention applied thereto.
Figure 4:
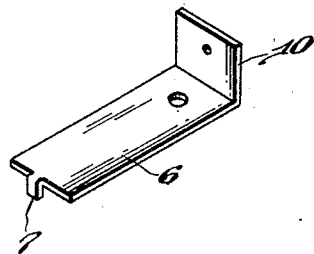
Fig. 4 is perspective view of the clip.
Figure 3:
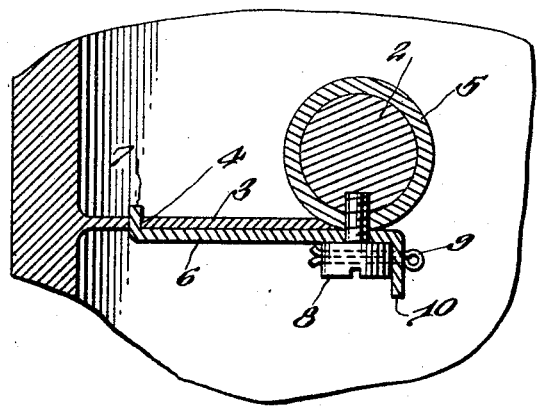
Fig. 3 is an enlarged sectional view similar to Fig. 2.

Again referring to the drawing illustrating one of the many constructions of my invention the numeral 1 designates a well known form of piston including a wrist pin 2. Extending inwardly from the interior surface of the piston is a wing 3 provided with an opening 4. This wing extends to the bearing 5 of the piston and has flat engagement with a clip 6 which is provided with a tongue 7 arranged in the opening 4. A set screw 8 is passed through the clip and bearing and is held in place by the pin 9 that is passed through the flange 10 of the clip and through the head of the set screw.

From the foregoing description taken in connection with the accompanying drawing it will be apparent that by arranging a clip upon the wing with a tongue in the opening 4 the set screw may be readily threaded into the wrist pin and locked in such position by inserting the pin 9 through the flange and through the head of the set screw.

It is, of course, to be understood that the clip may be fixed to the piston in other manners than illustrated and may be associated with the set screw in other ways; therefore, I do not desire to be limited in any manner except as set forth in the claims hereunto appended.

Having thus described my invention what I claim is:

1. A cotter pin structure comprising in combination with a piston and wrist pin therefor, a clip having one end fixed to a portion of the piston, a set screw passing through the clip and into the wrist pin and a cotter pin passing through the set screw and a portion of said clip.

2. In combination a piston, a wing extending from the interior wall thereof and provided with an opening, a wrist pin, a clip having a tongue entering said opening, a set screw passed through the clip and engaging the wrist pin, and a cotter pin mounted in a portion of the clip and passing through said set screw.

3. In combination a piston and wrist pin therefor, a wing extending from the interior wall of the piston and provided with an opening, a clip having a tongue entering said opening, removable means for connecting said clip to the wrist pin and means for retaining said removable means against movement.

In testimony whereof I affix my signature.

MAXWELL E. RALSTEN.